(12) United States Patent
Nimura et al.

(10) Patent No.: US 9,812,239 B2
(45) Date of Patent: Nov. 7, 2017

(54) CORE MANUFACTURING DEVICE

(71) Applicant: JTEKT CORPORATION, Osaka-shi, Osaka (JP)

(72) Inventors: Keita Nimura, Okazaki (JP); Naotake Kanda, Okazaki (JP); Ryosuke Yamaguchi, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 71 days.

(21) Appl. No.: 14/596,752

(22) Filed: Jan. 14, 2015

(65) Prior Publication Data

US 2015/0206642 A1  Jul. 23, 2015

(30) Foreign Application Priority Data

Jan. 21, 2014 (JP) ................. 2014-008533

(51) Int. Cl.
*B23P 19/00* (2006.01)
*H02K 15/00* (2006.01)
*H01F 13/00* (2006.01)
*H02K 15/03* (2006.01)

(52) U.S. Cl.
CPC .......... *H01F 13/003* (2013.01); *H02K 15/03* (2013.01); *Y10T 29/49012* (2015.01); *Y10T 29/53143* (2015.01)

(58) Field of Classification Search
CPC ........ H02K 15/03; H02K 25/00; H02K 7/125; Y10T 29/49009; Y10T 29/49012; Y10T 29/49075; Y10T 29/4902

USPC ........................ 29/732, 596, 598, 602.1, 729
See application file for complete search history.

(56) References Cited

U.S. PATENT DOCUMENTS

| | | | |
|---|---|---|---|
| 9,312,055 B2 * | 4/2016 | Honkura | ................. H01F 1/083 |
| 2003/0025415 A1 | 2/2003 | Hino et al. | |
| 2013/0093121 A1 | 4/2013 | Honkura et al. | |

FOREIGN PATENT DOCUMENTS

| | | |
|---|---|---|
| EP | 1 282 215 A1 | 2/2003 |
| EP | 2 667 484 A2 | 11/2013 |
| JP | H07-183124 A | 7/1995 |
| JP | H09-285049 A | 10/1997 |
| JP | 2009-171764 A | 7/2009 |
| JP | 4726105 B2 | 7/2011 |

(Continued)

OTHER PUBLICATIONS

Anonymous; "Magnet keeper"; XP002756626; Retrieved from the Internet: URL:https://web.archive.org/web/20131003115856/http://en.wikipedia.org/wiki/Magnet_keeper; Oct. 3, 2013.

(Continued)

*Primary Examiner* — Thiem Phan
(74) *Attorney, Agent, or Firm* — Oliff PLC

(57) ABSTRACT

A manufacturing device for a rotor core includes: a magnetization device that magnetizes magnet raw materials before being magnetized disposed in magnet insertion holes of the rotor core to turn the magnet raw materials before being magnetized into permanent magnets; and a detachment device that detaches the rotor core from the magnetization device. The detachment device also functions as a mounting device that mounts a jig around the rotor core when the rotor core is detached from the magnetization device.

6 Claims, 14 Drawing Sheets

(56) References Cited

FOREIGN PATENT DOCUMENTS

WO   2011/126023 A1   10/2011

OTHER PUBLICATIONS

Apr. 18, 2016 Extended Search Report issued in European Patent Application No. 15 15 1448.6.
Aug. 15, 2017 Office Action issued in Japanese Patent Application No. 2014-008533.

* cited by examiner

CORE MANUFACTURING DEVICE

INCORPORATION BY REFERENCE

The disclosure of Japanese Patent Application No. 2014-008533 filed on Jan. 21, 2014 including the specification, drawings and abstract, is incorporated herein by reference in its entirety.

BACKGROUND OF THE INVENTION

1. Field of the Invention

The present invention relates to a core manufacturing device and a core manufacturing method.

2. Description of Related Art

There have been known Interior Permanent Magnet (IPM) motors in which permanent magnets for field excitation are embedded inside a rotor. Japanese Patent No. 4726105 describes an example of a manufacturing method for a rotor core for use in the IPM motors. In the manufacturing method described in Japanese Patent No. 4726105, first, a cylindrical rotor core in which a plurality of magnet insertion holes are formed is shaped, and thereafter magnet raw materials before being magnetized are injected into the magnet insertion holes through injection molding. After that, a magnetization device is disposed so as to cover the outer periphery of the rotor core, and magnetic flux is supplied from the magnetization device to the rotor core to magnetize the magnet raw materials disposed in the magnet insertion holes. Consequently, the magnet raw materials are magnetized to be turned into permanent magnets, thus completing the manufacture of a rotor core with embedded permanent magnets.

Permanent magnets (e.g. neodymium magnets (Nd—Fe—B magnets) used for field excitation for motors have such properties that the permanent magnets can be magnetized by even a weak external magnetic field as the temperature of the permanent magnets becomes higher. Therefore, it is advantageous to heat the rotor core to a high temperature in the magnetization process.

In the case where the magnetization process is performed with the rotor core maintained at a high temperature, however, the permanent magnets of the rotor core may be irreversibly demagnetized depending on the timing to detach the rotor core from the magnetization device.

The magnetization properties of the permanent magnets such as neodymium magnets are varied in accordance with the temperature as illustrated in FIG. 20, for example. In FIG. 20, C1, C2, and C3 indicate an initial magnetization curve, a B-H curve at a normal temperature, and a B-H curve at a high temperature, respectively, for the permanent magnets such as neodymium magnets. As is clear from comparison between the normal-temperature B-H curve C2 and the high-temperature B-H curve C3 of FIG. 20, the permanent magnets such as neodymium magnets have such properties that as the temperature rises, the absolute value of the coercive force becomes smaller, and the absolute value of the magnetic field corresponding to the inflection point becomes smaller. Therefore, there is the following difference in magnetic flux density of the permanent magnets after the completion of the manufacture of the rotor core between a case where the rotor core is detached from the magnetization device after the rotor core is cooled in the magnetization device and a case where the rotor core is detached from the magnetization device with the rotor core still at a high temperature after the completion of the magnetization process.

When the rotor core is attached to the magnetization device, the magnetic flux density of the magnet raw materials of the rotor core is increased from zero along the initial magnetization curve C1 by a magnetic field generated by the magnetization device. In this course, the magnet raw materials are magnetized to be turned into permanent magnets. When the magnetization of the permanent magnets is substantially saturated so that the permanent magnets are completely magnetized, the magnetic flux density of the permanent magnets reaches a magnetic flux density Bs1. After that, in the case where the rotor core is temporarily cooled in the magnetization device, the B-H curve for the permanent magnets transitions from the high-temperature B-H curve C3 to the normal-temperature B-H curve C2 as indicated by the arrow a1 in the drawing. That is, the magnetic flux density of the permanent magnets is increased from the magnetic flux density Bs1 corresponding to the high-temperature B-H curve C3 to a magnetic flux density Bs2 corresponding to the normal-temperature B-H curve C2. After that, when the rotor core that has been completely cooled is detached from the magnetization device, the magnetic field applied from the magnetization device to the permanent magnets disappears. Therefore, the magnetic flux density of the permanent magnets is varied to a magnetic flux density Bd1 on an operation point P1, which is an intersection point between the normal-temperature B-H curve C2 and a permeance line L1, as indicated by the arrow a2 in the drawing. Because the operation point P1 is positioned on a straight portion of the normal-temperature B-H curve C2, the permanent magnets are not irreversibly demagnetized.

In the case where the rotor core that has been subjected to the magnetization process is detached from the magnetization device without being cooled in the magnetization device, in contrast, the rotor core is detached from the magnetization device with the rotor core still at a high temperature. The magnetic flux density of the permanent magnets is varied along the high-temperature B-H curve C3 as indicated by the arrow b in the drawing. That is, the magnetic flux density of the permanent magnets is varied to a magnetic flux density Bd2 on an operation point P2, which is an intersection point between the high-temperature B-H curve C3 and the permeance line L1. In this event, the operation point P2 is lower than an inflection point Pcn of the high-temperature B-H curve C3. In this case, when the permanent magnets are cooled to a normal temperature, the operation point of the permanent magnets is only varied from P2 to P3. That is, compared to a case where the rotor core is cooled in the magnetization device, the magnetic flux density of the permanent magnets is demagnetized by a difference ΔBd between the magnetic flux density Bd1 corresponding to the operation point P1 and a magnetic flux density Bd3 corresponding to the operation point P3. If the permanent magnets are irreversibly demagnetized in this way, the amount of effective magnetic flux that interlinks with a stator coil may be decreased to reduce motor output torque.

In order to avoid such irreversible demagnetization, it is advantageous to cool the permanent magnets with the rotor core mounted to the magnetization device. In the case where such a method is used, however, the magnetization device cannot be used while the permanent magnets are being cooled, thus significantly increasing the cycle time of the magnetization device. This results in deteriorated productivity.

Such an issue is not peculiar to the manufacture of a rotor core with embedded permanent magnets, but also involves the manufacture of a suitable core provided with permanent magnets such as a stator core.

SUMMARY OF THE INVENTION

An object of the present invention is to provide a core manufacturing device and a core manufacturing method capable of securing productivity while suppressing irreversible demagnetization of permanent magnets provided in a core.

An aspect of the present invention provides a manufacturing device for a core, including: a magnetization device that magnetizes magnet raw materials before being magnetized provided in the core to turn the magnet raw materials before being magnetized into permanent magnets; a detachment device that detaches the core from the magnetization device; and a mounting device that mounts a jig composed of a magnetic body or an electromagnet to the core. The jig is being mounted around the detached core when the core is detached from the magnetization device by the detachment device.

Another aspect of the present invention provides a manufacturing method for a core, including: magnetizing magnet raw materials before being magnetized provided in the core using a magnetization device to turn the magnet raw materials before being magnetized into permanent magnets; detaching the magnetized core from the magnetization device; mounting a jig composed of a magnetic body or an electromagnet to the core; and cooling the core with a relative permeability around the core detached from the magnetization device maintained at a value of more than one by the jig mounted to the core.

According to such a core manufacturing device and a core manufacturing method, the core can be cooled with the relative permeability around the core maintained at a value of more than one by the jig mounted to the core when the core is detached from the magnetization device. Consequently, compared to a case where the core is cooled in an atmosphere with the jig not mounted thereto, the magnetic resistance of the magnetic circuit formed by the permanent magnets in the core is reduced. Therefore, it is possible to increase the permeance coefficient of the permanent magnets. As illustrated in FIG. 20, the permeance line for the permanent magnets during cooling corresponds to a line L2, the absolute value of the slope of which is larger than that of a line L1 corresponding to a case where the core is cooled with the jig not mounted thereto. Consequently, the permanent magnets can be cooled with the operation point of the permanent magnets positioned at a point P4, which is higher than the inflection point Pcn of the high-temperature B-H curve C3. Therefore, it is possible to suppress irreversible demagnetization of the permanent magnets.

With the core manufacturing device and the core manufacturing method described above, the core is cooled after the core is detached from the magnetization device. Therefore, the magnetization device can also be used while the core is being cooled. Consequently, compared to a case where the core is cooled with the core attached to the magnetization device, it is possible to shorten the cycle time of the magnetization device, thus securing productivity.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of a manufacturing device and a manufacturing method for a rotor core will be described. First, the structure of the rotor core is described. The rotor core according to the embodiment is a so-called inner rotor used in a synchronous motor and disposed inside a cylindrical stator.

Figure 1:
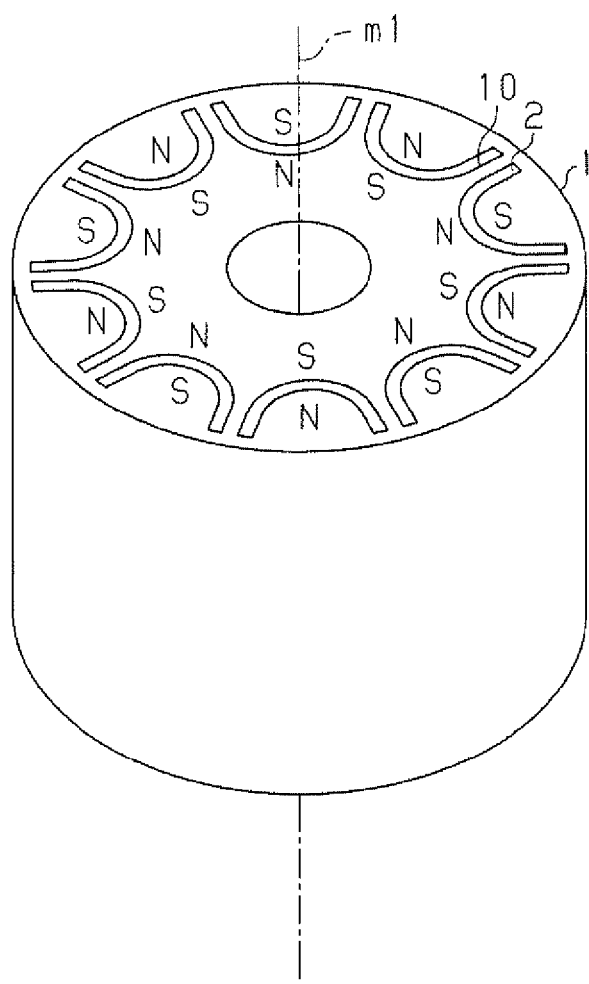
FIG. 1 is a perspective view illustrating the perspective structure of a rotor core.

As illustrated in FIG. 1, a rotor core 1 is formed in a cylindrical shape around an axis m1. The rotor core 1 is structured by stacking a plurality of electromagnetic steel sheets in the axial direction. A plurality of magnet insertion holes 10 are formed at equiangular intervals in the circumferential direction to penetrate the rotor core 1 in the axial direction. The magnet insertion holes 10 have a U shape that opens toward the outer peripheral side of the rotor core in cross section taken along a plane that is orthogonal to the axial direction of the rotor core. Permanent magnets 2 are disposed in the magnet insertion holes 10. The permanent magnets 2 are composed of bond magnets such as neodymium magnets (Nd—Fe—B magnets). Portions of the permanent magnets 2 inside and outside the U shape have different magnetic poles. In the rotor core 1, permanent magnets 2 having N pole in the portion inside the U shape and permanent magnets 2 having S pole in the portion inside the U shape are disposed alternately in the circumferential direction. Consequently, the rotor core 1 has a 10-pole structure in which N poles and S poles are arranged alternately along the circumferential direction in the outer peripheral portion of the rotor core 1.

A manufacturing device and a manufacturing method for the rotor core 1 will be described.

Figure 2:
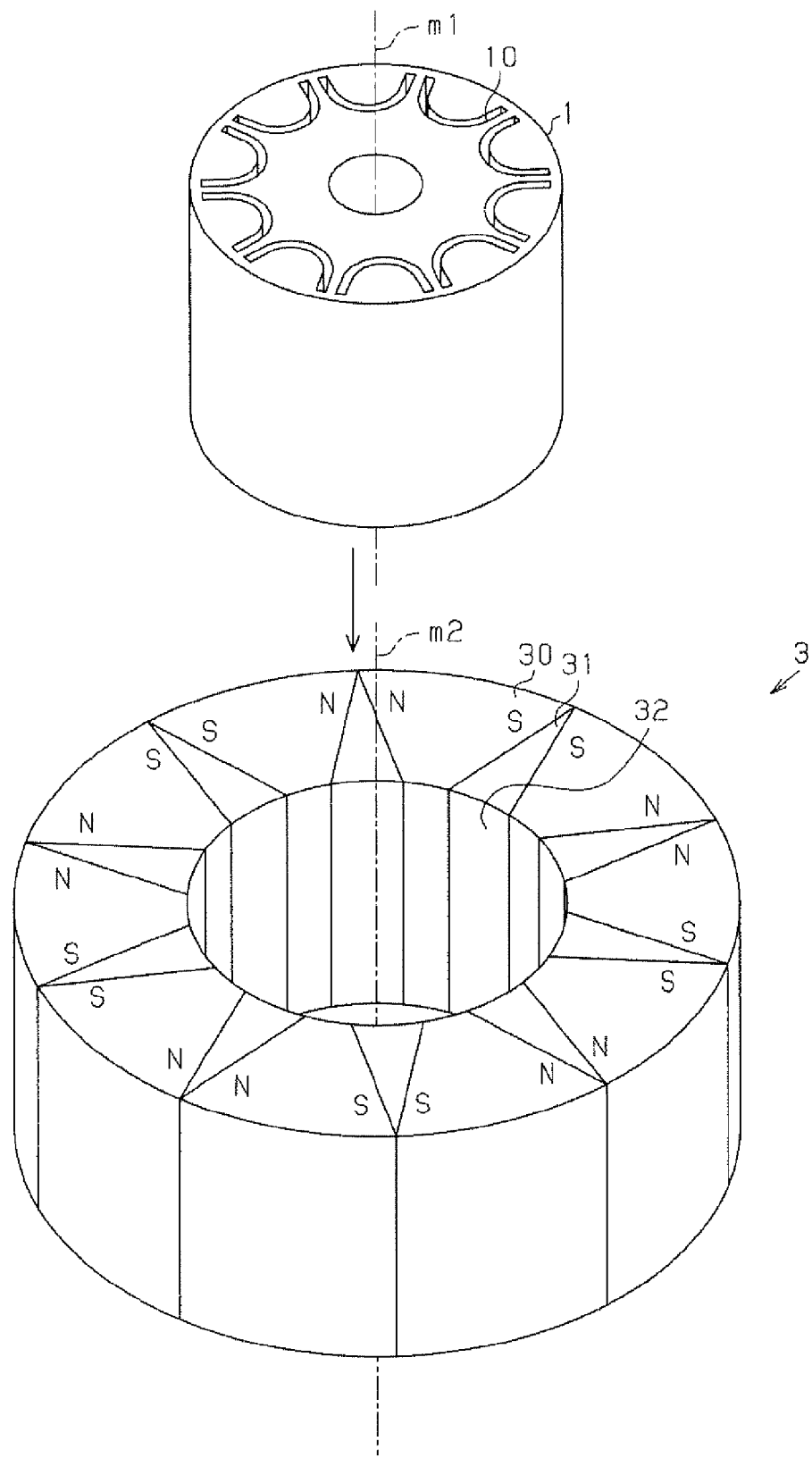
FIG. 2 is a perspective view illustrating a process in which the rotor core is attached to a magnetization device in a first embodiment of a manufacturing device and a manufacturing method for the rotor core.

To manufacture the rotor core 1 according to the embodiment, first, the basic structure of the rotor core 1 is formed by stacking a plurality of electromagnetic steel sheets in the axial direction, the electromagnetic steel sheets having U-shaped magnet insertion holes 10 formed at equiangular intervals in the circumferential direction. Next, the rotor core 1 is heated using a heater device (not illustrated), and thereafter the heated rotor core 1 is attached to a magnetization device 3 as illustrated in FIG. 2.

The magnetization device 3 includes a plurality of permanent magnets 30 and a plurality of magnetization yokes 31 disposed alternately in the circumferential direction about an axis m2 and integrally assembled into an annular shape by an assembly member (not illustrated). The permanent magnets 30 are formed such that the width in the circumferential direction about the axis m2 becomes larger toward the radially outer side, and have different magnetic poles at both end portions in the circumferential direction. The permanent magnets 30 are disposed such that opposing magnetic poles of permanent magnets 30 that are adjacent in the circumferential direction about the axis m2 are of the same magnetic polarity. The magnetization yokes 31 are interposed between opposing portions of the permanent magnets 30 of the same magnetic polarity. The rotor core 1 heated in the heating process is inserted into an insertion hole 32 formed in the center portion of the magnetization device 3 by a conveyance device (not illustrated). At this time, portions on the inner side of the U shape of the magnet insertion holes 10 oppose the inner peripheral portions of the magnetization yokes 31, and portions at the boundaries between magnet insertion holes 10 that are adjacent in the circumferential direction of the rotor core oppose the inner peripheral portions of the permanent magnets 30. Attachment of the rotor core 1 to the magnetization device 3 is thus completed.

Figure 3:
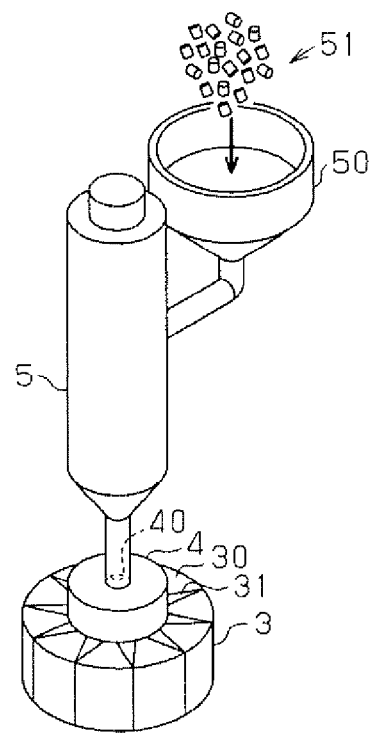
FIG. 3 is a perspective view illustrating the perspective structure of an injection machine according to the first embodiment.

Next, as illustrated in FIG. 3, after a die 4 is placed on the upper surface of the rotor core 1, a magnet raw material before being magnetized is injected from an injection machine 5 into the magnet insertion holes 10 of the rotor core 1 via the die 4. The magnet raw material is prepared by mixing magnetic powder such as neodymium magnetic powder before being magnetized with a plastic resin and molding and solidifying the mixture.

The injection machine 5 has an input portion 50. Magnet raw material pellets 51 are input to the input portion 50. The magnet raw material pellets 51 are prepared by granulating the magnet raw material. The injection machine 5 heats and melts the magnet raw material pellets 51 input to the input portion 50, and injects the molten magnet raw material into an inlet port 40 of the die 4. Passages that extend from the inlet port 40 to the magnet insertion holes 10 of the rotor core 1 are formed in the die 4. The magnet raw material at a high temperature injected from the injection machine 5 into the inlet port 40 of the die 4 is injected into the magnet insertion holes 10 of the rotor core 1 through the passages inside the die 4 for injection molding.

Since the rotor core 1 has been heated in advance in the heating process, the magnet raw material that has flowed into the magnet insertion holes 10 of the rotor core 1 is maintained at a high temperature. Consequently, the flowability of the magnet raw material is secured, thus enabling the magnet raw material to be easily embedded in the magnet insertion holes 10.

Figure 4:
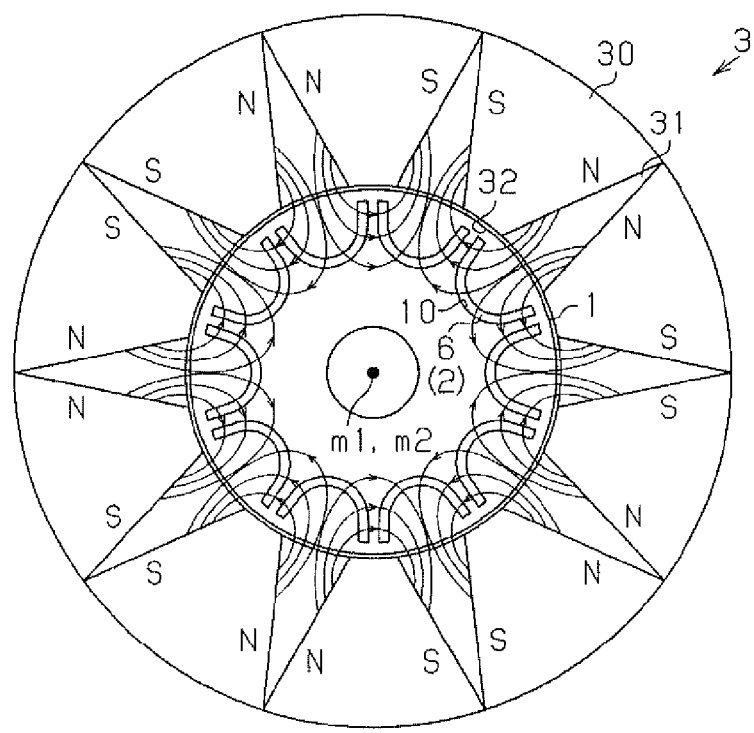
FIG. 4 is a plan view illustrating the planar structure of the magnetization device to which the rotor core is attached according to the first embodiment.

As illustrated in FIG. 4, the magnetization device 3 applies magnetic flux indicated by the arrows in the drawing to magnet raw materials 6 embedded in the magnet insertion holes 10 of the rotor core 1. That is, magnetic flux generated by the permanent magnets 30 passes in the order of the magnetization yoke 31 that is adjacent to the N pole of the permanent magnet 30, the rotor core 1, the magnet raw material 6, the rotor core 1, and the magnetization yoke 31 that is adjacent to the S pole of the permanent magnet 30. Consequently, magnetic paths extending from the outer side toward the inner side of the U shape or magnetic paths extending from the inner side toward the outer side of the U shape are formed in the magnet raw materials 6. By such magnetic paths, the magnet raw materials 6 embedded in the rotor core 1 are magnetized such that the inside of the U shape serves as the N pole, or such that the inside of the U shape serves as the S pole. In this way, in the manufacturing device and the manufacturing method according to the embodiment, the process in which the magnet raw materials 6 are injected into the magnet insertion holes 10 of the rotor core 1 for injection molding and the process in which the magnet raw materials 6 embedded in the magnet insertion holes 10 are magnetized are executed substantially at the same time.

In the case where the magnet raw materials 6 are composed of neodymium magnets or the like as in the embodiment, the magnet raw materials 6 have such properties that as the temperature becomes higher, the magnet raw materials 6 are more easily magnetized. In this respect, in the manufacturing device and the manufacturing method according to the embodiment, the magnet raw materials 6 are injected into the rotor core 1 which has been heated in the heating process, and therefore the magnet raw materials 6 can be magnetized while being maintained at a high temperature. Therefore, the magnetic flux density of the permanent magnets 2 after being magnetized can be increased.

Figure 5:
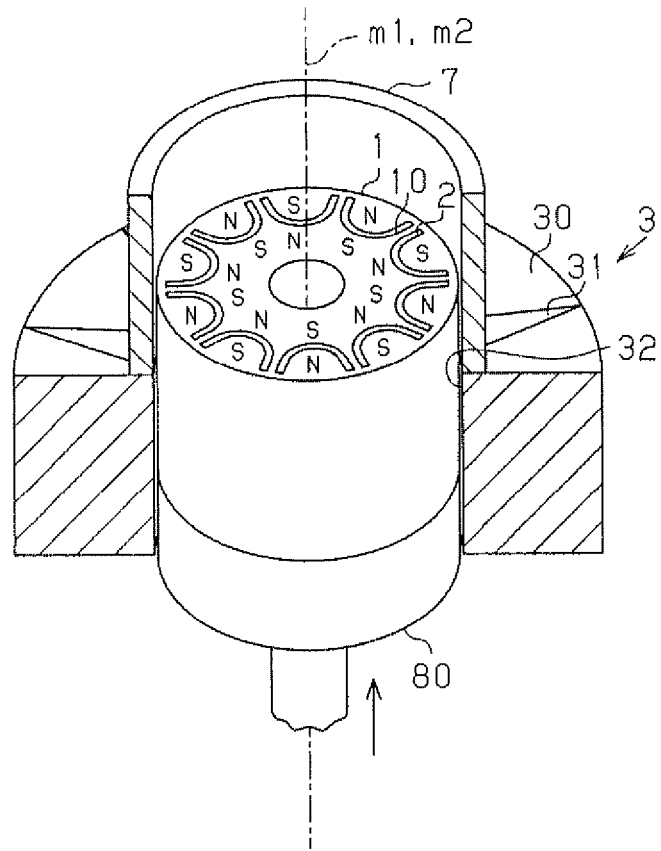
FIG. 5 is a sectional view illustrating a process in which the rotor core is detached from the magnetization device and a process in which the rotor core is mounted to a jig according to the first embodiment.
Figure 6:
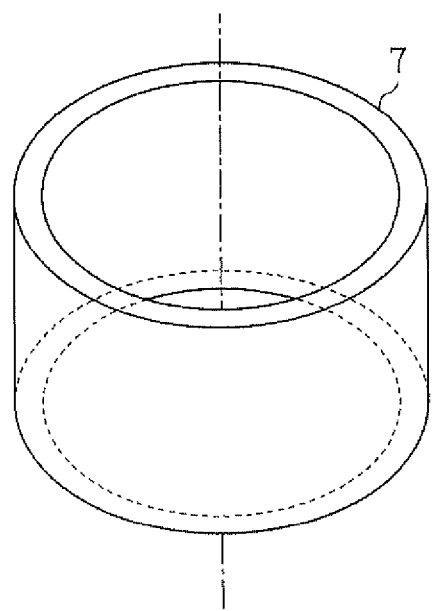
FIG. 6 is a perspective view illustrating the perspective structure of the jig mounted to the rotor core according to the first embodiment.

As illustrated in FIG. 5, the process in which the rotor core 1 is detached from the magnetization device 3 and the process in which a jig 7 is mounted to the rotor core 1 are performed at the same time. As illustrated in FIG. 6, the jig 7 is composed of a cylindrical soft magnetic body. The inside diameter of the jig 7 is set to be slightly larger than the outside diameter of the rotor core 1. In addition, the length of the jig 7 in the axial direction is set to be equal to or more than the length of the rotor core 1 in the axial direction.

Figure 7:
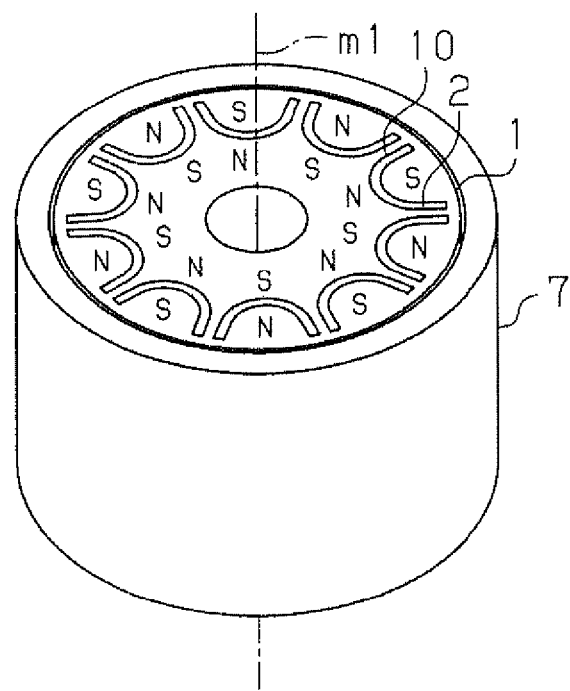
FIG. 7 is a perspective view illustrating the perspective structure of the rotor core to which the jig is mounted according to the first embodiment.

When injection molding of the permanent magnets 2 into the magnet insertion holes 10 and magnetization of the permanent magnets 2 are completed, the rotor core 1 is immediately detached from the magnetization device 3. Thus, the rotor core 1 is detached from the magnetization device 3 still at a high temperature (a temperature at which the inflection point falls within the second quadrant in the case where the properties of the magnetic circuit are represented by a B-H curve; in the embodiment, about 150° C.). In the detachment process, as illustrated in FIG. 5, the jig 7 is first placed on the upper surface of the magnetization device 3 so as to be coaxial with the insertion hole 32 of the magnetization device 3. After that, the bottom surface of the rotor core 1 attached to the magnetization device 3 is pushed up by a detachment device 80 to move the rotor core 1 into the jig 7. In this way, the detachment device 80 according to the embodiment also functions as a mounting device that mounts the jig 7 to the outer periphery of the rotor core 1. When the entire rotor core 1 is housed inside the jig 7, the rotor core 1 is carried together with the jig 7 to a cooling line by a conveyance device (not illustrated). In the cooling line, as illustrated in FIG. 7, the rotor core 1 is cooled with the jig 7 mounted to the outer periphery of the rotor core 1. The manufacture of the rotor core 1 is completed by detaching the jig 7 from the rotor core 1 after the rotor core 1 is completely cooled.

The functions and the advantageous effects of the manufacturing device and the manufacturing method for the rotor core 1 according to the embodiment will be described.

Figure 8:
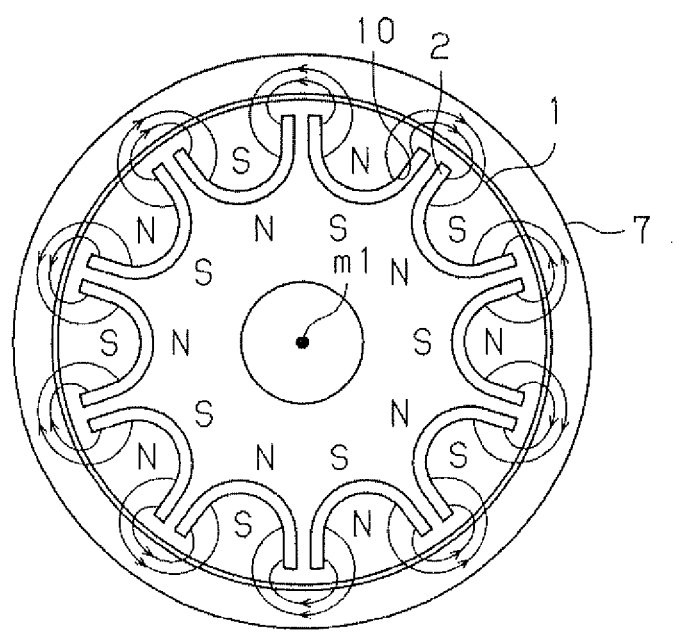
FIG. 8 is a plan view illustrating the planar structure of the rotor core to which the jig is mounted according to the first embodiment.
Figure 9:
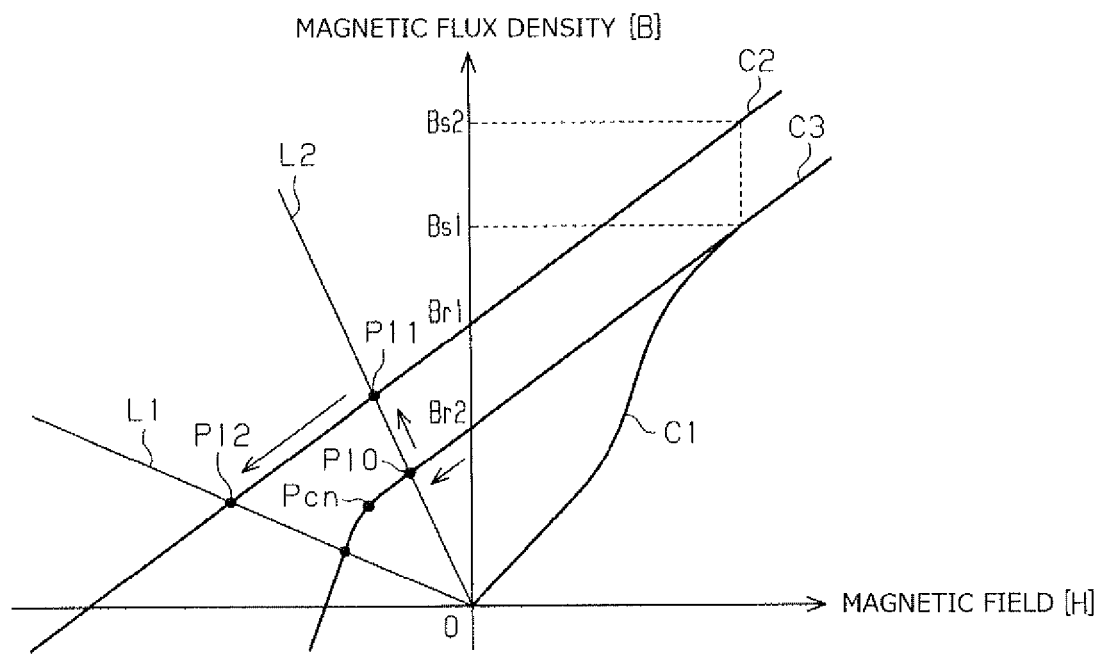
FIG. 9 is a graph illustrating an initial magnetization curve C1, a normal-temperature B-H curve C2, a high-temperature B-H curve C3, and permeance lines L1, L2 for permanent magnets of the rotor core in a magnetization process and a cooling process according to the first embodiment.

(1) By mounting the jig 7 composed of a magnetic body to the outer periphery of the rotor core 1 detached from the magnetization device 3 as illustrated in FIG. 7, the rotor core 1 can be cooled with the relative permeability around the rotor core 1 maintained at a value of more than one. Consequently, as indicated by the arrows in FIG. 8, magnetic paths that short-circuit different magnetic poles of permanent magnets 2 that are adjacent in the circumferential direction are easily formed via the jig 7 around the rotor core 1. Compared to a case where the rotor core 1 is cooled in an atmosphere with the jig 7 not mounted thereto, the magnetic resistance of the magnetic circuit formed by the permanent magnets 2 in the rotor core 1 is reduced. Therefore, it is possible to increase the permeance coefficient of the permanent magnets 2. As illustrated in FIG. 9, the permeance line for the permanent magnets 2 during cooling corresponds to a line L2, the absolute value of the slope of which is larger than that of a line L1 corresponding to a case where the rotor core 1 is cooled with the jig 7 not mounted thereto. As a result, the magnetic flux density and the operation point of the permanent magnets 2 according to the embodiment are varied as indicated by the arrows in the drawing.

Figure 20:
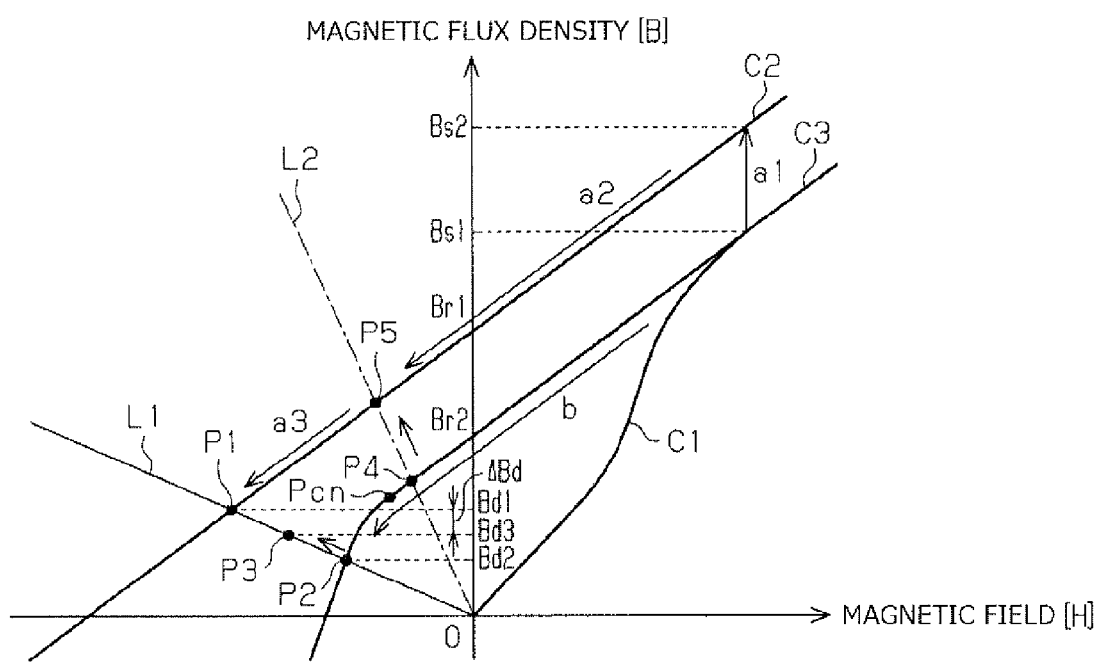
FIG. 20 is a graph illustrating an initial magnetization curve C1, a normal-temperature B-H curve C2, a high-temperature B-H curve C3, and permeance lines L1, L2 for permanent magnets of a rotor core in a magnetization process and a cooling process according to a manufacturing method for a rotor core according to the related art.

More particularly, when the rotor core 1 still at a high temperature is detached from the magnetization device 3, the magnetic field in the magnetizing direction applied from the magnetization device 3 to the permanent magnets 2 is decreased. Therefore, the magnetic flux density of the permanent magnets 2 is decreased from a magnetic flux density Bs1 indicated in FIG. 9 along a high-temperature B-H curve C3. When the jig 7 is mounted to the rotor core 1 detached from the magnetization device 3, the operation point of the permanent magnets 2 is positioned at an intersection point P10 between the high-temperature B-H curve C3 and the permeance line L2. That is, the operation point P10 of the permanent magnets 2 is higher than an inflection point Pcn of the high-temperature magnetization curve C3. After that, when the rotor core 1 is cooled to a normal temperature with the jig 7 mounted thereto through the cooling process, the operation point of the permanent magnets 2 is varied to an intersection point P11 between the permeance line L2 and a normal-temperature B-H curve C2. After that, when the jig 7 is detached from the rotor core 1, the permeance coefficient of the permanent magnets 2 is decreased, and the operation point of the permanent magnets 2 is varied to an intersection point P12 between the permeance line L1 and the normal-temperature B-H curve C2. Thus, it is possible to suppress irreversible demagnetization corresponding to an amount of demagnetization ΔBd indicated in FIG. 20.

(2) As illustrated in FIGS. 5 and 7, the magnetization device 3 can also be used while the rotor core 1 is being cooled by cooling the rotor core 1 after the rotor core 1 is detached from the magnetization device 3. Compared to a case where the rotor core 1 is cooled with the rotor core 1 attached to the magnetization device 3, it is possible to shorten the cycle time of the magnetization device 3, thus improving productivity.

(3) As illustrated in FIG. 5, the jig 7 can be easily mounted to the rotor core 1 by mounting the jig 7 to the rotor core 1 detached from the magnetization device 3.

Next, a second embodiment of a manufacturing device and a manufacturing method for a rotor core will be described. Differences of the embodiment from the first embodiment will be mainly described below.

Figure 10:
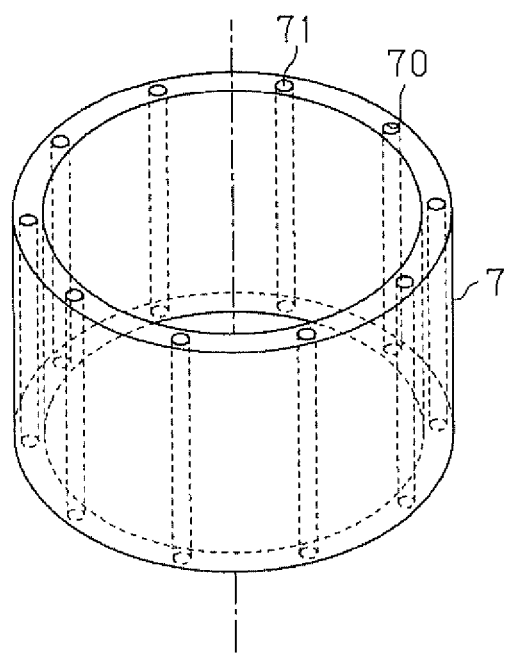
FIG. 10 is a perspective view illustrating the perspective structure of a jig for a second embodiment of a manufacturing device and a manufacturing method for a rotor core.

As illustrated in FIG. 10, a plurality of void portions 70 are formed at equiangular intervals in the circumferential direction to penetrate the jig 7 according to the embodiment in the axial direction. Magnetic barrier members 71 composed of a non-magnetic body are embedded in the void portions 70.

To manufacture the rotor core 1 according to the embodiment, the rotor core 1 is heated. After that, as indicated by the long dashed double-short dashed lines in FIG. 11, the jig 7 is mounted to the outer periphery of the rotor core 1 by a mounting device 81. At this time, the jig 7 is mounted to the rotor core 1 such that the magnetic barrier members 71 are disposed at positions corresponding to boundary lines n between different magnetic poles of the rotor core 1 that are adjacent in the circumferential direction. Next, as illustrated in FIG. 12, the rotor core 1 is inserted together with the jig 7 into the insertion hole 32 of the magnetization device 3 by a conveyance device (not illustrated), and thereafter the injection molding process for the magnet raw materials illustrated in FIG. 3 and the magnetization process for the permanent magnets illustrated in FIG. 4 are performed. After that, as illustrated in FIG. 13, the rotor core 1 is detached together with the jig 7 from the magnetization device 3 by the detachment device 80. In the detachment process, first, the jig 7 is rotated relative to the rotor core 1 by the detachment device 80 to position the magnetic barrier members 71 at the center of the magnetic poles of the rotor core 1. After that, as illustrated in FIG. 13, the bottom surfaces of the rotor core 1 and the jig 7 are pushed up by the detachment device 80 so that the rotor core 1 and the jig 7 are integrally detached from the magnetization device 3. The rotor core 1 and the jig 7 are carried to a cooling line by a conveyance device (not illustrated). In the cooling line, the rotor core 1 is cooled with the jig 7 mounted to the outer periphery of the rotor core 1. The manufacture of the rotor core 1 is completed by detaching the jig 7 from the rotor core 1 after the rotor core 1 is completely cooled.

The functions and the advantageous effects of the manufacturing device and the manufacturing method for the rotor core 1 according to the embodiment will be described.

Figure 14:
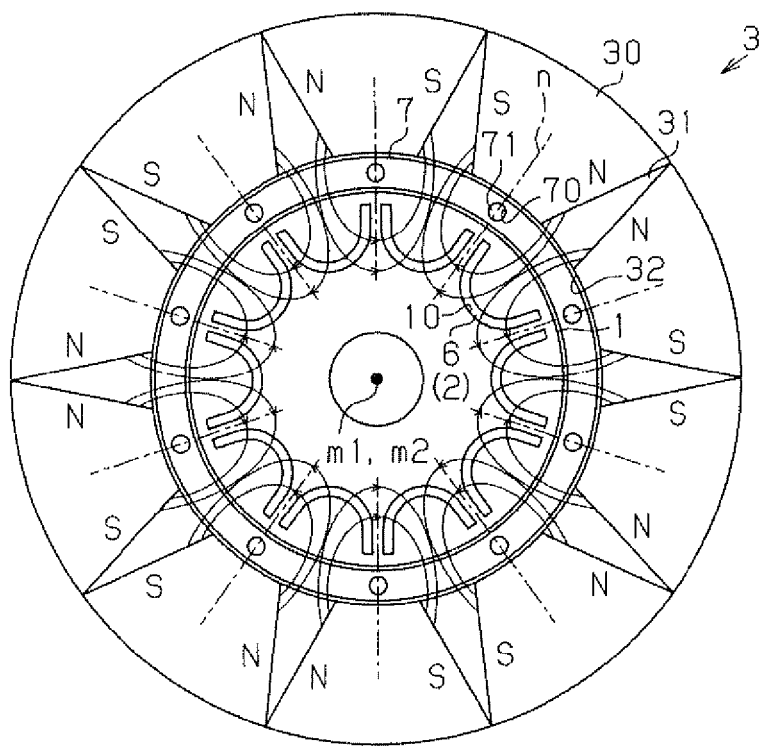
FIG. 14 is a plan view illustrating the planar structure of the magnetization device to which the rotor core and the jig are attached according to the second embodiment.
Figure 15:
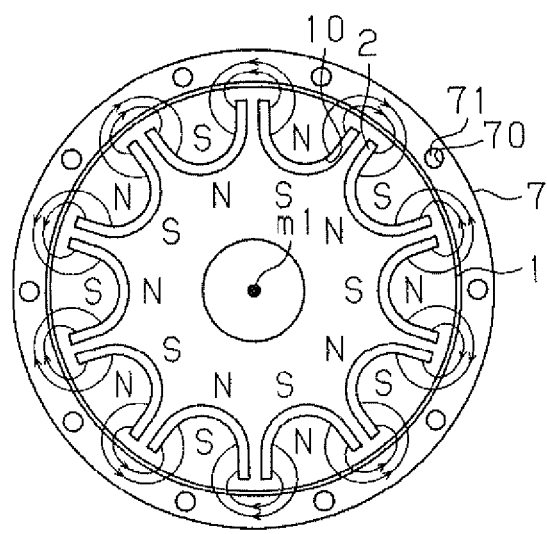
FIG. 15 is a plan view illustrating the planar structure of the rotor core to which the jig is mounted according to the second embodiment.

(4) By disposing the magnetic barrier members 71 at positions corresponding to the boundary lines n between different magnetic poles of the rotor core 1 that are adjacent in the circumferential direction in the magnetization process as illustrated in FIG. 14, it is possible to suppress formation of magnetic paths that short-circuit different magnetic poles that are adjacent in the circumferential direction in the magnetization device 3 via the jig 7. Generation of leakage flux during magnetization of the magnet raw materials 6 is suppressed, thus improving the rate of magnetization of the magnet raw materials 6 (permanent magnets 2).

(5) By positioning the magnetic barrier members 71 at the center of the magnetic poles of the rotor core 1 when cooling the rotor core 1 as illustrated in FIG. 5, magnetic paths indicated by the arrows in the drawing, that is, magnetic paths that short-circuit different magnetic poles of permanent magnets 2 that are adjacent in the circumferential direction, are easily formed via the jig 7 around the rotor core 1. Therefore, it is possible to adequately secure a relative permeability around the rotor core 1 of more than one. Consequently, an advantageous effect that is similar to the effect (1) of the first embodiment can be obtained, thus suppressing irreversible demagnetization of the permanent magnets 2.

Figure 11:
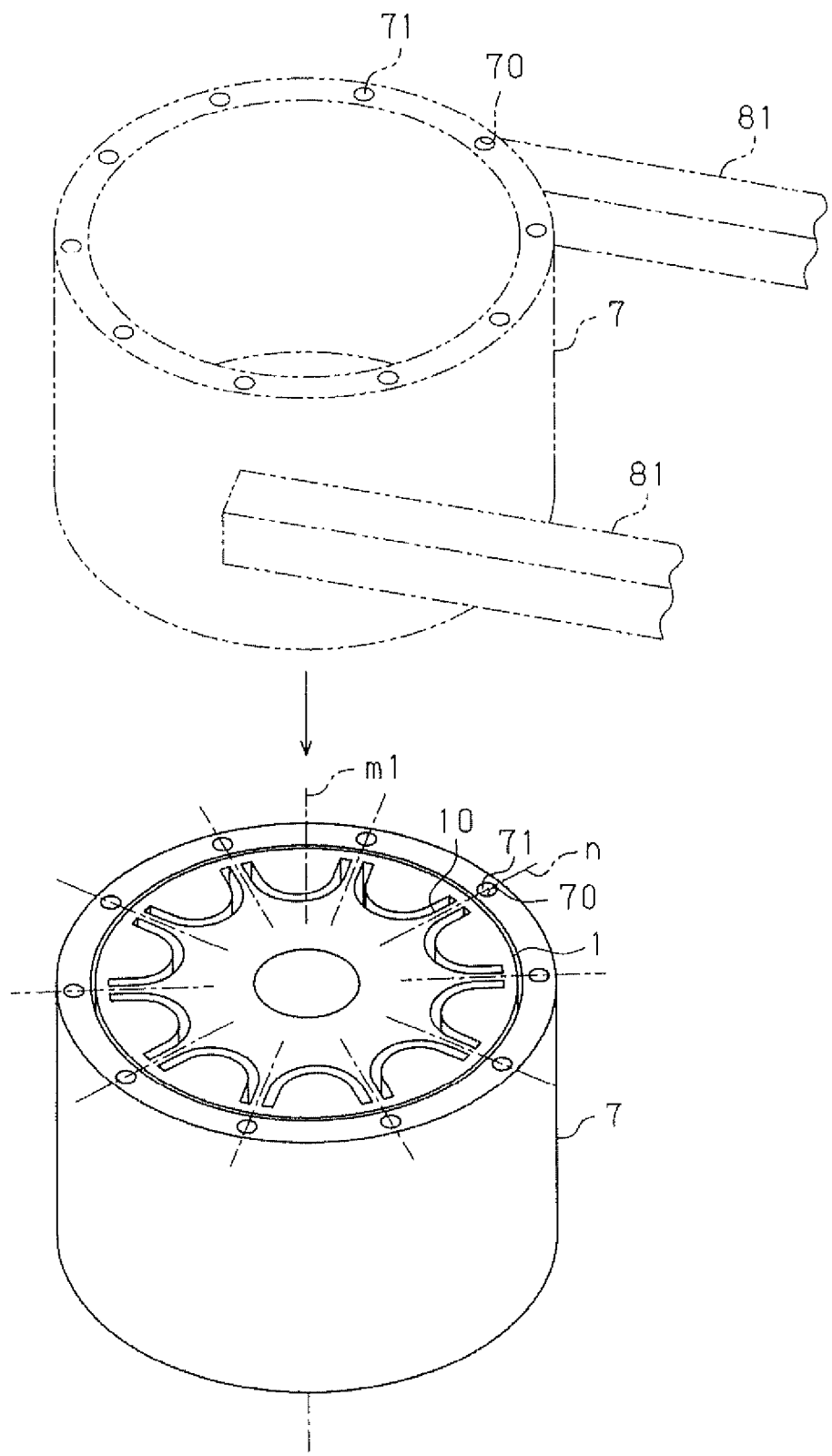
FIG. 11 is a perspective view illustrating a process in which a jig is mounted to the rotor core by a mounting device according to the second embodiment.
Figure 12:
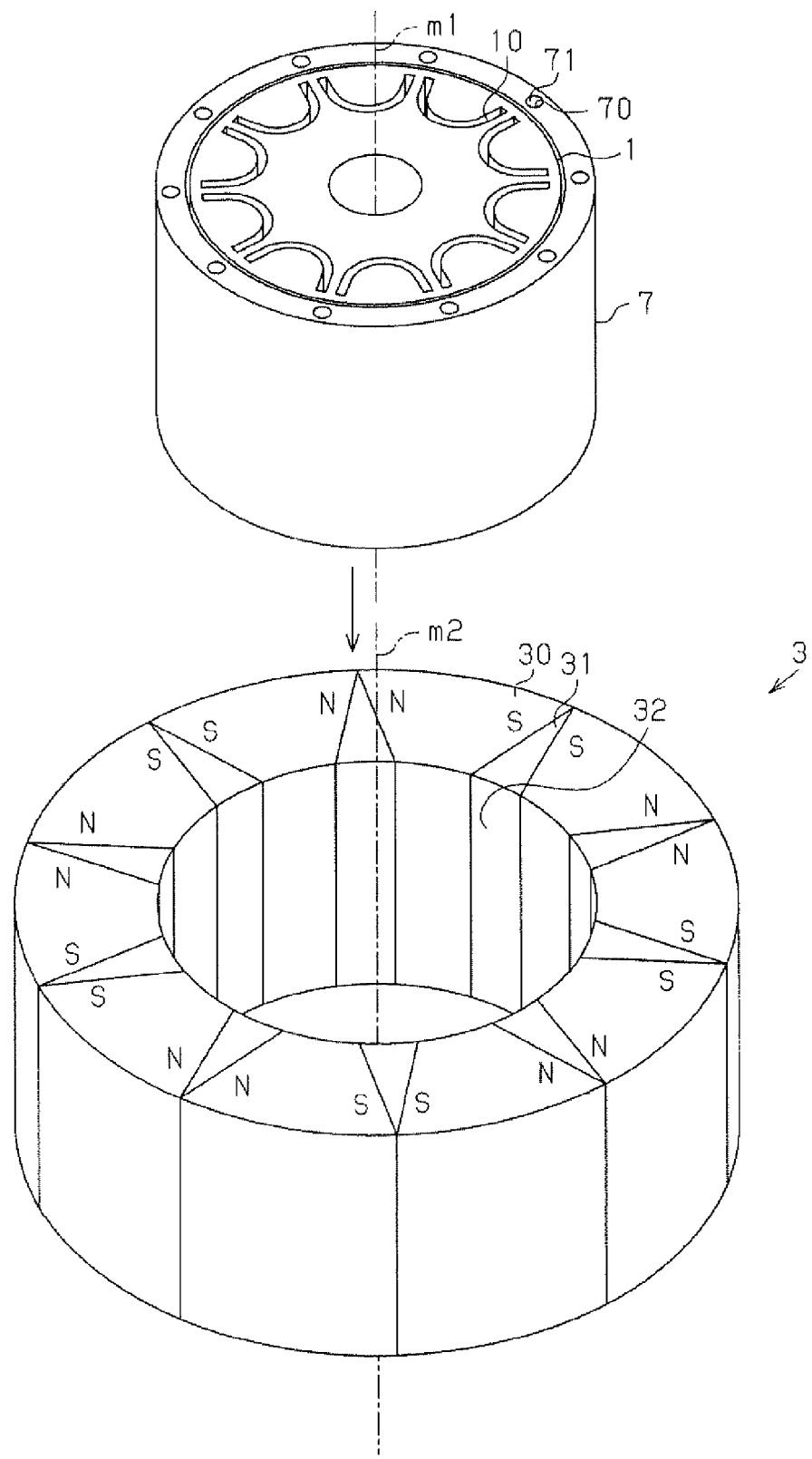
FIG. 12 is a perspective view illustrating a process in which the rotor core is attached to a magnetization device together with the jig according to the second embodiment.
Figure 13:
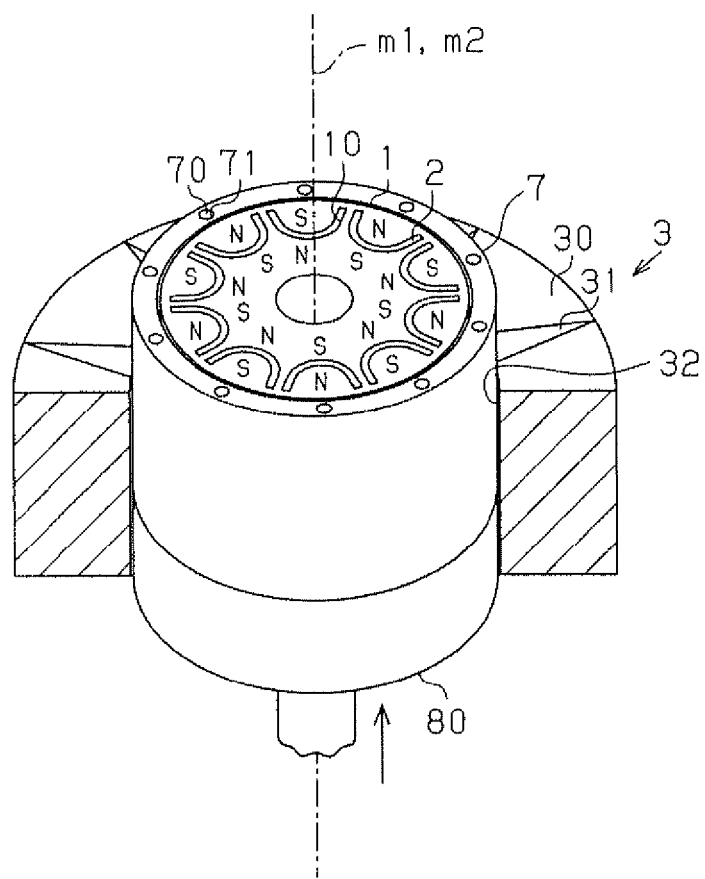
FIG. 13 is a perspective view illustrating a process in which the rotor core is detached from the mounting device together with the jig according to the second embodiment.

(6) As illustrated in FIGS. 11 and 12, the jig 7 can be easily mounted to the rotor core 1 by mounting the jig 7 to the rotor core 1 before being subjected to the magnetization process.

(7) The manufacturing device and the manufacturing method according to the embodiment are the same as those according to the first embodiment in that the rotor core 1 is cooled after the rotor core 1 is detached from the magnetization device 3. Therefore, an advantageous effect that is similar to the effect (2) of the first embodiment can be obtained.

A third embodiment of a manufacturing device and a manufacturing method for a rotor core will be described. Differences of the embodiment from the second embodiment will be mainly described.

Figure 16:
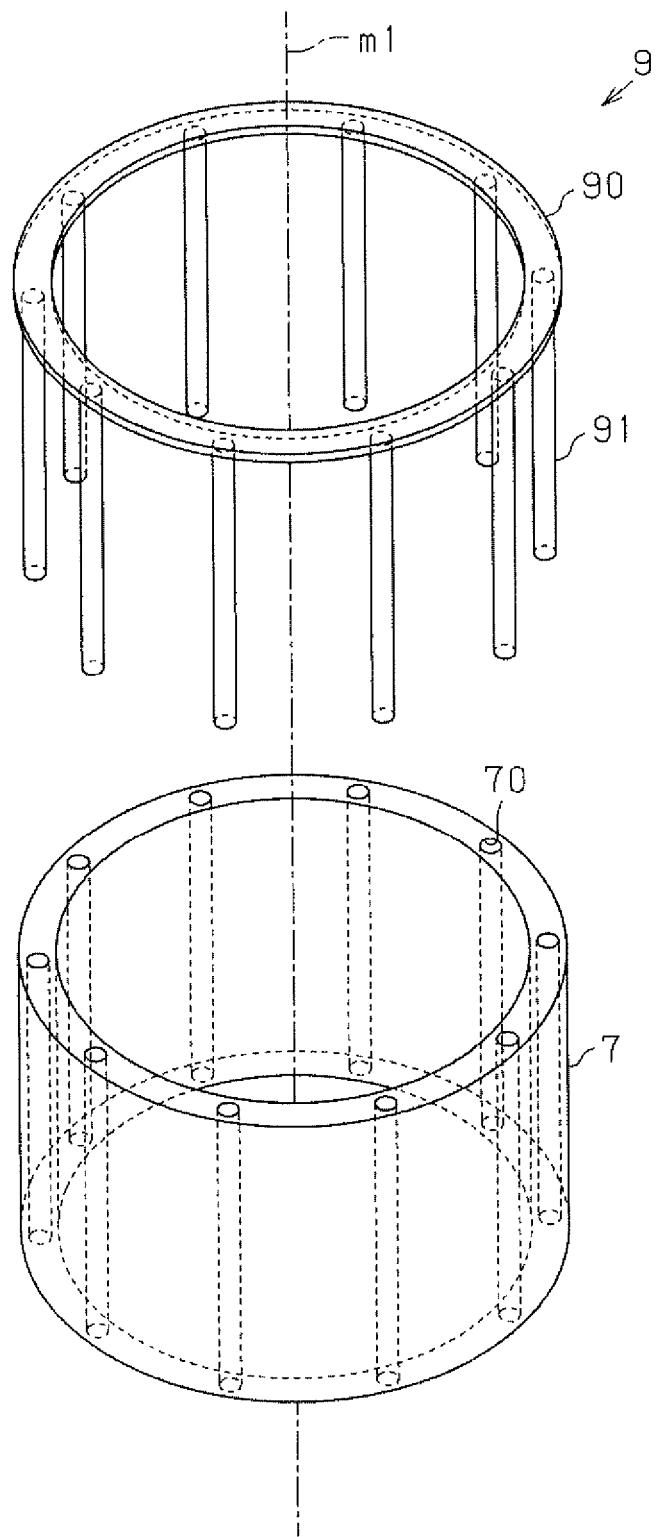
FIG. 16 is a perspective view illustrating the perspective structure of a first jig and a second jig for a third embodiment of a manufacturing device and a manufacturing method for a rotor core.

As illustrated in FIG. 16, a plurality of void portions 70 are formed at equiangular intervals in the circumferential direction to penetrate the jig 7 according to the embodiment in the axial direction. It should be noted, however, that the embodiment is different from the second embodiment in that the magnetic barrier members 71 are not embedded in the void portions 70. In the following description, the jig 7 will be referred to as a first jig for convenience.

In the embodiment, in addition, a second jig 9 that is separate from the first jig 7 is used. The second jig 9 is composed of a soft magnetic body, and has an annular portion 90 and a plurality of cylindrical pins 91 formed at equiangular intervals on an end surface of the annular portion 90 in the axial direction. The outside diameter of the pins 91 is set to be generally equal to the inside diameter of the void portions 70 of the first jig 7. The length of the pins 91 in the axial direction is set to be generally equal to the length of the void portions 70 of the first jig 7 in the axial direction. All the void portions 70 of the first jig 7 can be blocked by the pins 91 by mounting the second jig 9 to the first jig 7 with the pins 91 inserted into the void portions 70 through opening portions formed in an end surface of the first jig 7 in the axial direction.

Figure 17:
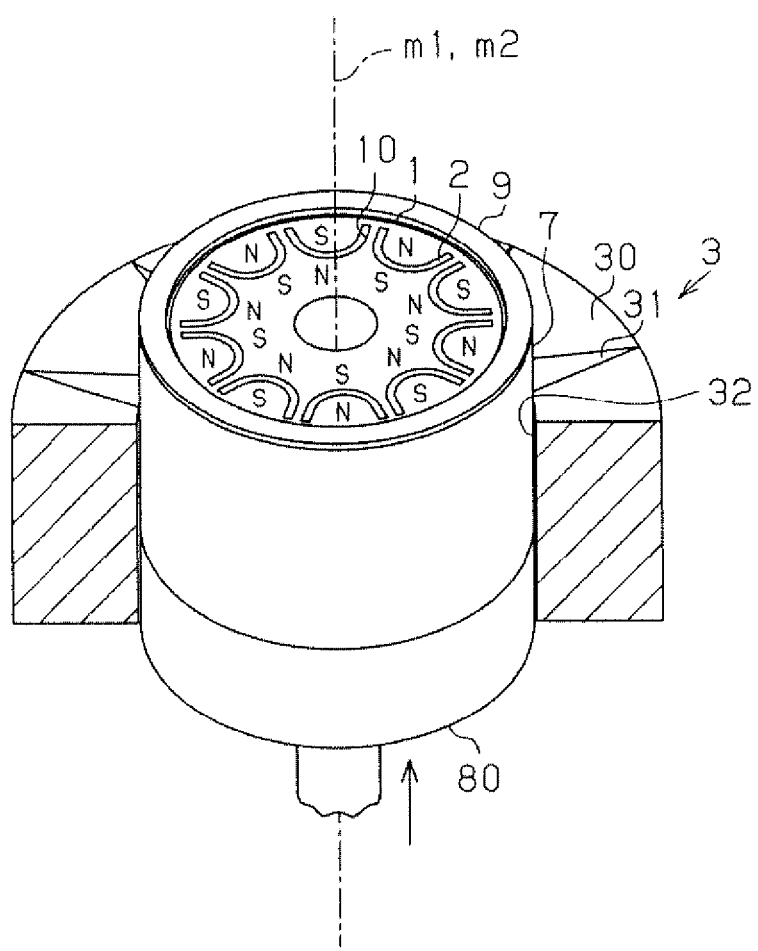
FIG. 17 is a perspective view illustrating a process in which the rotor core is detached from a magnetization device together with the first jig and the second jig according to the third embodiment.

To manufacture the rotor core 1 according to the embodiment, as in the second embodiment, the first jig 7 is mounted to the rotor core 1, and the rotor core 1 is mounted to the magnetization device 3. As illustrated in FIG. 11, the first jig 7 is mounted to the rotor core 1 such that the void portions 70 are disposed at positions corresponding to the boundary lines n between different magnetic poles of the rotor core 1 that are adjacent in the circumferential direction. As illustrated in FIG. 12, the rotor core 1 is inserted together with the first jig 7 into the insertion hole 32 of the magnetization device 3 by a conveyance device (not illustrated). After that, the injection molding process for the magnet raw materials illustrated in FIG. 3 and the magnetization process for the permanent magnets illustrated in FIG. 4 are performed. Subsequently, after the second jig 9 is mounted to the first jig 7 as illustrated in FIG. 17, the rotor core 1 is pushed up together with the first jig 7 and the second jig 9 by the detachment device 80 so that the rotor core 1, the first jig 7, and the second jig 9 are integrally detached from the magnetization device 3. The rotor core 1 is carried together with the first jig 7 and the second jig 9 to a cooling line by a conveyance device (not illustrated). In the cooling line, the rotor core 1 is cooled with the first jig 7 mounted to the outer periphery of the rotor core 1 and with the second jig 9 mounted to the first jig 7. The manufacture of the rotor core 1 is completed by detaching the first jig 7 and the second jig 9 from the rotor core 1 after the rotor core 1 is completely cooled.

The functions and the advantageous effects of the manufacturing device and the manufacturing method for the rotor core 1 according to the embodiment will be described.

(8) By disposing the void portions 70 at positions corresponding to the boundary lines n between different magnetic poles of the rotor core 1 that are adjacent in the circumferential direction during magnetization, it is possible to suppress formation of magnetic paths that short-circuit different magnetic poles that are adjacent in the circumferential direction in the magnetization device 3 via the jig 7 with the void portions 70 serving as magnetic barrier. Therefore, an advantageous effect that is similar to the effect (4) of the second embodiment can be obtained.

(9) By blocking the void portions 70 of the first jig 7 with the pins 91 of the second jig 9 when cooling the rotor core 1, magnetic barriers in the first jig 7 can be eliminated. Therefore, magnetic paths that short-circuit different magnetic poles of permanent magnets 2 that are adjacent in the circumferential direction are easily formed via the first jig 7 around the rotor core 1. Thus, an advantageous effect that is similar to the effect (5) of the second embodiment can be obtained.

(10) The jig 7 can be easily mounted to the rotor core 1 by mounting the first jig 7 to the rotor core 1 before being subjected to magnetization.

(11) The manufacturing device and the manufacturing method according to the embodiment are the same as those according to the first embodiment in that the rotor core 1 is cooled after the rotor core 1 is detached from the magnetization device 3. Therefore, an advantageous effect that is similar to the effect (2) of the first embodiment can be obtained.

The embodiments described above may also be implemented in the following forms.

In the first embodiment, the jig 7 is composed of a soft magnetic body. However, the jig 7 may be composed of any material that forms magnetic paths that short-circuit different magnetic poles of the permanent magnets 2 that are adjacent in the circumferential direction in the rotor core 1, and may be composed of a permanent magnet, an electromagnet, or the like, for example. In addition, the jig 7 may be composed of a combination of a plurality of a soft magnetic body, a permanent magnet, and an electromagnet, for example.

Figure 18:
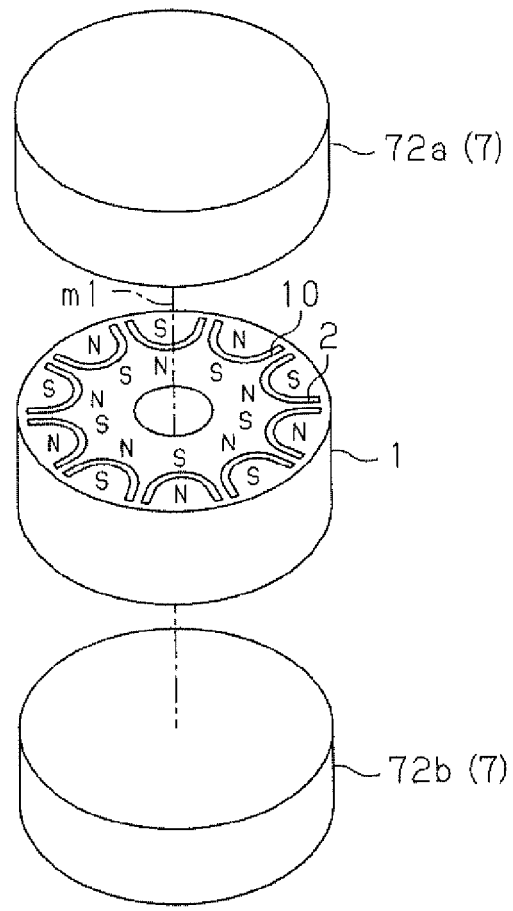
FIG. 18 is a perspective view illustrating the perspective structure of a rotor core and a pair of disk members constituting a jig for a different embodiment of a manufacturing device and a manufacturing method for a rotor core.
Figure 19:
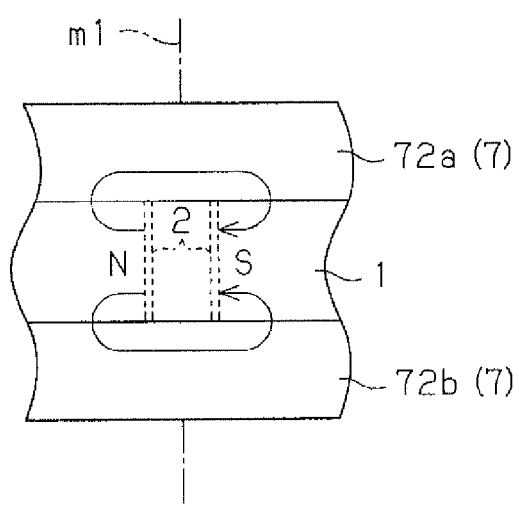
FIG. 19 is a side view illustrating the side structure of the rotor core to which the pair of disk members are attached according to the different embodiment.

In the first embodiment, the jig 7 to be mounted to the rotor core 1 is formed in a cylindrical shape. However, the shape of the jig 7 may be changed as appropriate. As illustrated in FIG. 18, a pair of disk members 72a, 72b that can cover both end surfaces of the rotor core 1 in the axial direction, for example, may be used as the jig 7. As illustrated in FIG. 19, if the disk members 72a, 72b are brought into abutment with both end surfaces of the rotor core 1, magnetic paths that short-circuit different magnetic poles of permanent magnets 2 that are adjacent in the circumferential direction are formed via the disk members 72a, 72b in the rotor core 1. Therefore, the same effect as that of the jig 7 according to the first embodiment can be obtained. In addition, a similar structure may be used in the second embodiment and the third embodiment.

In the second embodiment, the magnetic barrier members 71 are embedded in the void portions 70 of the jig 7. However, the void portions 70 in which the magnetic barrier members 71 are not embedded may be used as magnetic barriers.

In the second embodiment, the magnetic barrier members 71 are positioned at the center of the magnetic poles of the rotor core 1 when the rotor core 1 is cooled. However, the positions of the magnetic barrier members 71 may be changed to any position offset from the boundary lines n between different magnetic poles of the rotor core 1 that are adjacent in the circumferential direction.

The void portions 70 formed in the jig 7 according to the second embodiment and the third embodiment are not limited to being shaped so as to penetrate the jig 7 in the axial direction 7, and may be shaped as appropriate such as being open only in one of both end surfaces of the jig 7 in the axial direction, for example. In the case where the shape of the void portions 70 of the first jig 7 is changed in the third embodiment, the shape of the second jig 9 is accordingly changed.

The rotor core 1 according to the embodiments is composed of electromagnetic steel sheets. However, a soft magnetic body such as electromagnetic soft iron, for example, may also be used as the material of the rotor core 1.

In the embodiments, bond magnets are used as the permanent magnets 2 used in the rotor core 1. However, sintered magnets, compression-molded magnets, or the like, for example, may also be used as the permanent magnets 2.

The permanent magnets 2 embedded in the rotor core 1 according to the embodiments have a generally U shape in cross section taken along a plane that is orthogonal to the axial direction of the rotor core. However, the shape of the permanent magnets 2 is not limited thereto. The permanent magnets 2 may have a linear shape, a V shape, or an angular C shape in cross section taken along a plane that is orthogonal to the axial direction of the rotor core, for example.

The rotor core 1 according to the embodiments have a 10-pole structure. However, the number of magnetic poles of the rotor core 1 is not limited, and may be changed as appropriate.

The rotor core 1 according to the embodiments is structured with the permanent magnets 2 embedded. However, the structure of the rotor core 1 is not limited thereto. The rotor core 1 may be structured with permanent magnets bonded to the outer peripheral surface, for example.

The structure of the detachment device 80 according to the embodiments may be changed as appropriate as long as the rotor core 1 can be detached from the magnetization device 3. In addition, the structure of the mounting device 81 may be changed as appropriate as long as the jig 7 can be attached to the rotor core 1.

The embodiments are not limited to being applied to a manufacturing device and a manufacturing method for an inner rotor, and may also be applied to a manufacturing device and a manufacturing method for an outer rotor or an axial-gap rotor, for example. In addition, the embodiments are not limited to being applied to a manufacturing device and a manufacturing method for the rotor core 1, and may also be applied to a manufacturing device and a manufacturing method for a suitable core provided with permanent magnets such as a stator core used in a brushed DC motor and provided with magnets for field excitation, for example.

What is claimed is:

1. A manufacturing device for a core, comprising:
a magnetization device that magnetizes magnet raw materials before being magnetized provided in the core to turn the magnet raw materials before being magnetized into permanent magnets;
a detachment device that detaches the core from the magnetization device; and
a mounting device that mounts a jig composed of a magnetic body or an electromagnet to the core, wherein
the jig is being mounted around the detached core when the core is detached from the magnetization device by the detachment device;
the jig is composed of a soft magnetic body;
the mounting device is configured to mount the jig to the core before the magnet raw materials are magnetized;
the detachment device is configured to detach the core together with the jig from the magnetization device;
the core is formed in a cylindrical shape, and has different magnetic poles provided in an outer peripheral portion by the permanent magnets and arranged alternately at equiangular intervals along a circumferential direction;
the jig has magnetic barriers arranged at the equiangular intervals in the circumferential direction;
the mounting device mounts the jig to the core such that the magnetic barriers are disposed at positions corresponding to boundary lines between different magnetic poles of the core that are adjacent in the circumferential direction; and
the detachment device is configured to detach the core together with the jig from the magnetization device after removing the magnetic barriers from the positions corresponding to the boundary lines between the magnetic poles.

2. The manufacturing device for a core according to claim 1, wherein the mounting device is configured to mount the jig to the core detached from the magnetization device by the detachment device.

3. The manufacturing device for a core according to claim 1, wherein
the detachment device is configured to remove the magnetic barriers from the positions corresponding to the boundary lines between the magnetic poles by rotating the jig relative to the core to offset positions of the magnetic barriers from the positions corresponding to the boundary lines between the magnetic poles.

4. The manufacturing device for a core according to claim 3, wherein
the detachment device is configured to offset the positions of the magnetic barriers to centers of the magnetic poles when rotating the jig relative to the core to offset the positions of the magnetic barriers from the positions corresponding to the boundary lines between the magnetic poles.

5. The manufacturing device for a core according to claim 1, wherein
the jig is composed of a cylindrical member having an inside diameter that is larger than an outside diameter of the core, and has void portions extending in an axial direction and formed at the equiangular intervals; and
the magnetic barriers are composed of the void portions or a non-magnetic body inserted into the void portions.

6. The manufacturing device for a core according to claim 1, wherein
the jig is composed of
a first jig composed of a cylindrical member having an inside diameter that is larger than an outside diameter of the core, and having void portions that open in an end surface in an axial direction as the magnetic barriers, and
a second jig composed of a soft magnetic body and inserted into the void portions from opening portions of the void portions formed in the end surface of the first jig in the axial direction; and
the detachment device is configured to remove the magnetic barriers from the positions corresponding to the boundary lines between the magnetic poles by blocking the void portions of the first jig with the second jig.

* * * * *